June 30, 1925.
A. STANSFIELD
1,544,111
PROCESS OF REDUCING ORES
Filed March 22, 1920
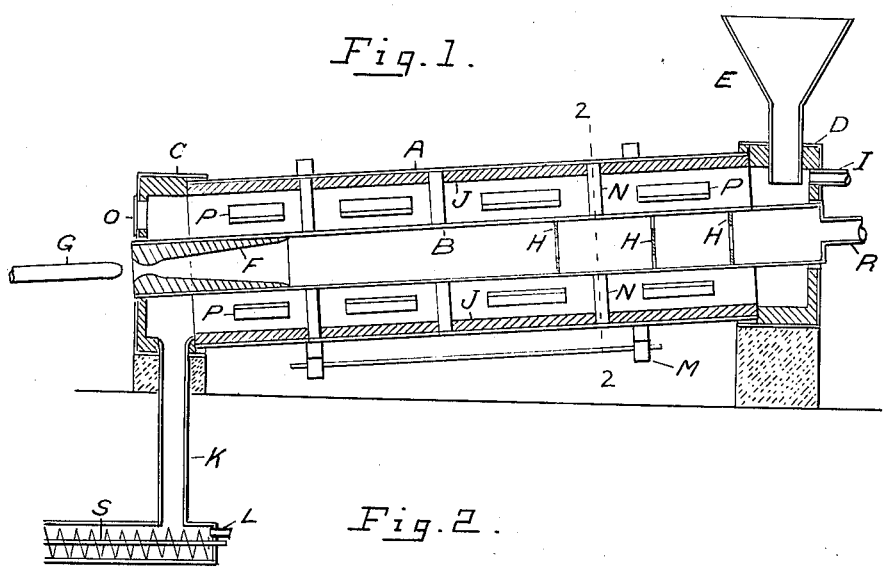
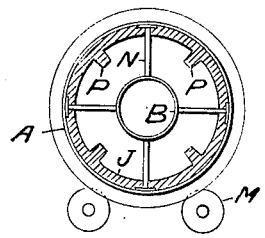
Inventor
Alfred Stansfield
By
Attorney Patented June 30, 1925.

1,544,111

UNITED STATES PATENT OFFICE.

ALFRED STANSFIELD, OF MONTREAL, QUEBEC, CANADA.

PROCESS OF REDUCING ORES.

Application filed March 22, 1920. Serial No. 367,851.

*To all whom it may concern:*

Be it known that I, ALFRED STANSFIELD, a subject of the King of Great Britain and Ireland, residing at Montreal, in the Province of Quebec, Dominion of Canada, have invented new and useful Improvements in the Process of Reducing Ores, of which the following is a specification.

The invention relates to the treatment of oxidized metallic ores and more particularly iron ores and has for its object to reduce or deoxidize the ores and convert them into the metallic state without fusion.

Recently attempts have been made to convert iron ores into metallic iron by means of the electric furnace with the object of replacing the blast furnace. It has been found that under certain conditions to carry out this conversion satisfactorily and economically it is necessary first to prepare the ore and convert it into a finely divided metallic powder or what is known as iron sponge, and this invention relates to a new method of carrying out this conversion.

The ore is first reduced to a fine powder and if necessary roasted to get rid of any sulphur, moisture, $CO_2$ etc. It is then mixed with finely divided carbonaceous material such as coke or charcoal in suitable proportions, such as from 15% to 30% of the ore. If the ore has been roasted the carbonaceous material should be heated before mixture otherwise the mixture should be heated to drive off any moisture and to feed the material sufficiently heated to prevent cooling the reducing furnace to any degree.

The heated mixture is then fed into an enclosed chamber of considerable length with an outlet at the opposite end through which the treated material is withdrawn. Means are provided to cause the material to travel towards the outlet and to thoroughly agitate it during its progress.

Means are also provided to heat the said chamber in zones of increasing temperature towards the outlet up to 800° C. or in certain cases up to 1000° C.

By this method of graduated zones of temperature, the gases given off at the hotter end from the reaction between the ore and the carbonaceous material are reducing gases and are used to assist in the reduction of the ore in the cooler zones.

Thus the progress of reduction may be approximately shown by the following equations:—

In the case of hematite $Fe_2O_3$, we have

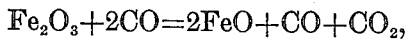
$$Fe_2O_3 + 2CO = 2FeO + CO + CO_2,$$

that is when the mixture enters the cooler end of the furnace with a temperature of about 700° C. On passing to the hotter zones at about 800° C. The

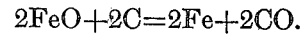
$$2FeO + 2C = 2Fe + 2CO.$$

The CO thus produced meeting the requirements of the first equation.

With magnetite $Fe_3O_4$ the ore may first be roasted and converted into $Fe_2O_3$ and then treated as above, or by direct reduction of the magnetite

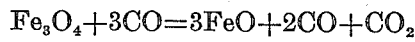
$$Fe_3O_4 + 3CO = 3FeO + 2CO + CO_2$$

at the cooler end, and then towards the hotter end $3FeO + 3C = 3Fe + 3CO$.

It will then be seen that the CO given off at the hotter areas passes to the cooler areas and assists in the preliminary reduction.

The gases resulting from the reduction are withdrawn at the cooler end of the chamber and may be used for the preliminary heating of the ore or mixture.

An additional supply of reducing gases may be fed into the chamber at the hotter end. These gases if cooled may be utilized to cool the outgoing treated material by being fed through the passage by which that material is being withdrawn, resulting in these gases becoming highly heated when they enter the hotter end of the reducing chamber. The treated material is then either transferred direct to an electric furnace being protected from contact with air, or fed into storage bins hot, or further cooled to a temperature at which it will not reoxidize, after which it may be stored in the open.

I have found that the temperatures required for carrying out my process should range from 400° C. to 900° C. in the case of hematite, and to 1000° C. in the case of magnetite. The greater portion of the chamber should be at 700° C. or over.

By means of this treatment the product is practically a pure iron (Fe). The oxygen and carbon are withdrawn at the cooler end in gaseous form having a high percentage of $CO_2$.

By retarding the outlet of these gases the chamber may be maintained under slight pressure whereby and leaks of air inwards are obviated.

I have found that when sulphur is present in the carbonaceous material, the addition of limestone or burnt lime helps to eliminate the sulphur and also prevents sintering or adhesion of the reduced metal to the furnace walls.

In order to make clear the means employed for carrying out this process the following is a description of one form of apparatus.

Reference is made to the annexed drawings in which

Fig. 1 is a longitudinal section.

Fig. 2 is a cross section on the line 2—2 of Fig. 1.

The furnace is of the inclined revolving type in which B is the inner tube in which heat is generated at the lower end by the burner G. This end of the tube is protected from the direct heat of the flame by a suitable refractory lining F. The products of combustion pass out through the outlet R at the upper end.

Baffles H H may be arranged within the tube B at suitable distances from the burner G to delay the passage of the hot gases and provide zones of graduated heat in the tube.

The outer tube A is lined with a refractory lining J and rotates between stationary ends C and D by means of suitable gear M. The inner tube may rotate with the outer tube in which case radiating supports N would connect the tubes A and B. If only the outer tube rotates suitable bearings would be attached to the supports N surrounding the inner tube.

The outer tube is also provided with inwardly projecting ridges P P by means of which the material being treated is continuously agitated and moved towards the outlet.

The stationary end D supports the hopper E by means of which the material enters the furnace.

The outlet I provides a means of escape for the gases given off during the reduction of the ore.

The stationary end C supports the lower end of the tube B and contains the outlet K for the treated material. It may also contain windows or poking holes O for observing the condition of the interior of the furnace, for taking temperature readings, and for removing any obstructions that may form.

Connected to the outlet tube K is a conveyor S by means of which the treated material is withdrawn at the proper rate.

A gas inlet L is provided in the conveyor casing or the outlet tube K whereby reducing gases may be fed into the furnace through the treated material.

Having now described my invention, what I claim, is:—

1. The process of reducing iron ores consisting of feeding a preheated mixture of powdered ore and carbonaceous matter into the coolest end of a reducing chamber, passing the mixture with violent agitation in zones of increasing temperature and through the opposite flow of reducing gases in the chamber and withdrawing the material after treatment.

2. The process of reducing iron ores consisting of feeding a preheated mixture of powdered ore and carbonaceous matter into the coolest end of a reducing chamber, passing the mixture with violent agitation in zones of increasing temperature and through the opposite flow of reducing gases in the chamber, withdrawing and cooling the material after treatment to below the temperature of reoxidization before exposing it to air.

3. The process of reducing iron ores consisting of feeding a preheated mixture of powdered ore and carbonaceous matter into the cooler end of a reducing furnace with a temperature of about 700° C. passing the mixture gradually with continuous showering through the opposite flow of reducing gases in zones of increasing temperature to from 900° C. to 1000° C., and withdrawing the treated material.

4. The process of reducing iron ores consisting of feeding a preheated mixture of powdered ore and carbonaceous matter into the cooler end of a reducing furnace with a temperature of about 700° C. passing the mixture gradually with continuous showering through the opposite flow of reducing gases in zones of increasing temperature to from 900° C. to 1000° C., withdrawing the treated material and cooling it to below the temperature of reoxidization.

5. The process of reducing iron ores consisting of feeding a preheated mixture of powdered ore and carbonaceous matter into the cooler end of a reducing furnace with a temperature of about 700° C., passing the mixture with thorough agitation in zones of increasing temperature through the opposite flow of reducing gases produced by the action of the reduction and supplemented by additional reducing gases fed to the hotter end of the furnace, preheated by the outgoing treated material, and cooling the same to a temperature below that of reoxidization.

6. The process of reducing iron ores consisting of feeding a preheated mixture of powdered ore and carbonaceous matter into the upper and cooler end of a rotating tubular furnace heated by a central firetube, to a temperature of about 700° C. at the cooler end, conveying and showering the mixture by means of inwardly projecting plates through the opposite flow of reducing gases in zones of increasing temperature towards the lower end, and withdrawing the treated material.

7. The process of reducing iron ores consisting of feeding a preheated mixture of powdered ore and carbonaceous matter into the upper and cooler end of a rotating tubular furnace heated by a central firetube, to a temperature of about 700° C. at the cooler end, conveying and showering the mixture by means of inwardly projecting plates through the opposite flow of reducing gases in zones of increasing temperature towards the lower end, withdrawing the treated material and cooling it to below the temperature of reoxidization.

Signed this 15th day of March 1920.

ALFRED STANSFIELD.